United States Patent
Simon

(10) Patent No.: US 8,487,997 B2
(45) Date of Patent: Jul. 16, 2013

(54) METHOD FOR DISPLAYING AN IMAGE RECORDED BY A VIDEO CAMERA

(75) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 1091 days.

(21) Appl. No.: 11/664,357

(22) PCT Filed: Aug. 16, 2005

(86) PCT No.: PCT/EP2005/054016
§ 371 (c)(1),
(2), (4) Date: May 21, 2009

(87) PCT Pub. No.: WO2006/034924
PCT Pub. Date: Apr. 6, 2006

(65) Prior Publication Data
US 2009/0295920 A1  Dec. 3, 2009

(30) Foreign Application Priority Data

Sep. 30, 2004  (DE) .................. 10 2004 047 474
Oct. 20, 2004  (DE) .................. 10 2004 050 990

(51) Int. Cl.
*H04N 7/18*  (2006.01)
(52) U.S. Cl.
USPC ............ 348/148; 348/143; 382/260; 382/263

(58) Field of Classification Search
None
See application file for complete search history.

(56) References Cited

U.S. PATENT DOCUMENTS

2003/0160153 A1*  8/2003  Hara et al. .............. 250/214 VT
2004/0175053 A1*  9/2004  Kawamata et al. ........... 382/260

FOREIGN PATENT DOCUMENTS

| DE | 102 61 290 | 7/2003 |
| FR | 2 726 144 | 4/1996 |
| JP | 06 233309 | 8/1994 |
| JP | 2001016578 | 1/2001 |

* cited by examiner

Primary Examiner — Thu Nguyen
Assistant Examiner — Nam Tran
(74) Attorney, Agent, or Firm — Kenyon & Kenyon LLP

(57) ABSTRACT

In a method for displaying an image of a scene in front of a vehicle, recorded by a video camera, in which the scene in front of the vehicle contains a roadway which is illuminated by the vehicle's headlights, the gray values of the pixels of the image data generated by the video camera are weighted using a reduction factor, which is a function of the respective pixel within the image and of the brightness of objects in the near range in front of the vehicle, in such a way that the contrast between the display of the near range in front of the vehicle and the display of other parts of the image is reduced.

9 Claims, 4 Drawing Sheets

METHOD FOR DISPLAYING AN IMAGE RECORDED BY A VIDEO CAMERA

FIELD OF THE INVENTION

The present invention relates to a method for displaying an image of a scene in front of a vehicle recorded by a video camera, the scene in front of the vehicle containing a roadway which is illuminated by the vehicle's headlights.

BACKGROUND INFORMATION

Along with increasing improvement of image recording technology, active night vision systems for motor vehicles have been developed in which infrared lighting illuminates the scene in front of the vehicle and the image is recorded by an infrared-sensitive video camera. The high contrast of the recorded scene represents a particular problem in these systems. A high contrast occurs, for example, when a well-remitting roadway surface or a well-remitting brightly illuminated object is situated in the near range and when simultaneously a distant, poorly remitting and poorly illuminated object is present whose timely detection is of great importance. Such an object is a pedestrian wearing dark clothes, for example.

The healthy human eye is in a position to detect such high-contrast situations relatively well. A high contrast range may also be processed using modern video cameras. However, there is the problem that it is currently technically impossible to display the full contrast range on a display screen in such a way that the human eye is able to detect it completely. In the above-described situation, this results in the image of the headlight beam, appearing excessively bright, while distant poorly illuminated objects are hardly noticeable.

Therefore, it is the object of the present invention to also display scenes having a high contrast range on a display screen without bright objects or the roadway having an excessively bright display and/or glaring the user.

SUMMARY OF THE INVENTION

According to the present invention, this object is achieved in that a reduction factor, which is a function of the location of the respective pixel within the image and the brightness of objects in the near range in front of the vehicle, is used for evaluating the gray values of the pixels of the image data generated by the video camera in such a way that the contrast between the display of the near range in front of the vehicle and the display of other parts of the image is reduced.

As a rule, the objects in the near range are formed by the roadway, near range being that distance range which clearly differs with regard to the brightness of the headlight beam from more distant areas. However, the method allows other illuminated objects in the near range to also influence the reduction factor.

The reduction factor for the individual pixels is preferably calculated from a first factor which determines the distribution of the reduction across the image, and a second factor which determines the degree of reduction independently from the location within the image.

The method according to the present invention has the advantage that the effect, occurring due to the illumination which decreases with the distance from the headlights, of objects located directly in front of the vehicle being too brightly illuminated and objects further distant being too poorly illuminated, is only compensated when necessary. For example, if a roadway which is dark, wet, and free of bright objects is situated in the near range, then only a minor or no contrast reduction is carried out.

The present invention is not limited to an application using infrared headlights and an infrared-sensitive camera, but may also be used with visible light.

In an advantageous embodiment of the method according to the present invention, the first factor essentially corresponds to the camera image of the brightness distribution of a well-remitting roadway illuminated by the headlights. It is preferred that the first factor is stored as a matrix of values.

The first factor may be determined experimentally by pointing the headlights of a vehicle onto a roadway having a light pavement surface; a message may be displayed via a series of images, the vehicle preferably moving on the roadway. In addition, the image obtained in this way may be low-pass filtered so that unevenness in the illumination may be smoothed out, thus having no effect on the first factor.

It is also possible to establish the first factor analytically, e.g., based on the result of the application of a ray tracing method in which the illumination by the headlights, the reflection on the roadway, and the image recording are mathematically modeled.

An advantageous embodiment of the present invention provides that, for determining the second factor, the second factor is formed from the ratio of a first and a second mean value, the mean values being assigned for forming the first and the second mean value in reverse as a function of the first factor.

In a first variant of this embodiment, the assignment takes place in such a way that the gray values of the pixels, for which the first factor is less than a threshold value, enter the first mean value and the gray values of the pixels, for which the first factor is greater than the threshold value, enter the second mean value. The threshold value may be one-half of the maximum value of the first factor; however, other threshold values are also possible. This embodiment enables the formation of the second factor using relatively little computing resources.

In a second variant of this embodiment, which is adapted to the variation of the values of the first factor more accurately, the first mean value is formed by summing up the gray values of the pixels multiplied by one minus the first factor and the second mean value is formed by summing up the gray values of the pixels multiplied by the first factor.

For reducing the computing complexity, representative pixels, distributed across the image, may be used for forming the mean values during calculation of the second factor. For this purpose, every tenth pixel may be used in both horizontal and vertical directions.

In order to reliably prevent, in the event of unusual illumination and remission conditions, the occurrence of an undesirable increase, instead of a reduction in the contrast, the method according to the present invention may provide that the second factor is limited to a value which does not cause the image to become brighter.

Another advantageous embodiment of the method according to the present invention includes that the weighted gray values are calculated as follows:

$$g'(x,y)=g(x,y)\cdot(1-(1-f)\cdot h(x,y)), \text{ where}$$

g' denotes the weighted gray values
g denotes the non-weighted gray values,
f denotes the second factor, and
h denotes the first factor, and
x and y denote the coordinates of the pixels.

In the method according to the present invention, weightings to determine the extent to which pixels used for forming the second factor belong to an inner, brighter image area or to an outer, darker image area do not have to be constantly recalculated. Therefore, in a refinement, weightings for the pixels used for forming the second factor are stored in a memory.

In the method according to the present invention, it is actually assumed that the brightness distribution during recording of the image for obtaining the first factor is similar to the one occurring during operation. However, deviations in this regard may result due to the fact that the vehicle may be driven using different headlight adjustments. Therefore, in another refinement of the present invention, different sets of the variables stored in the memory are stored which correspond to different degrees of illumination of the roadway and in each case one set is selected as a function of the set or actually existing illumination by the headlights. This makes it possible to also respond when one headlight fails.

BRIEF DESCRIPTION OF THE DRAWINGS

Exemplary embodiments of the present invention are illustrated in the drawing on the basis of multiple figures and explained in greater detail in the following description.

DETAILED DESCRIPTION

Figure 1:
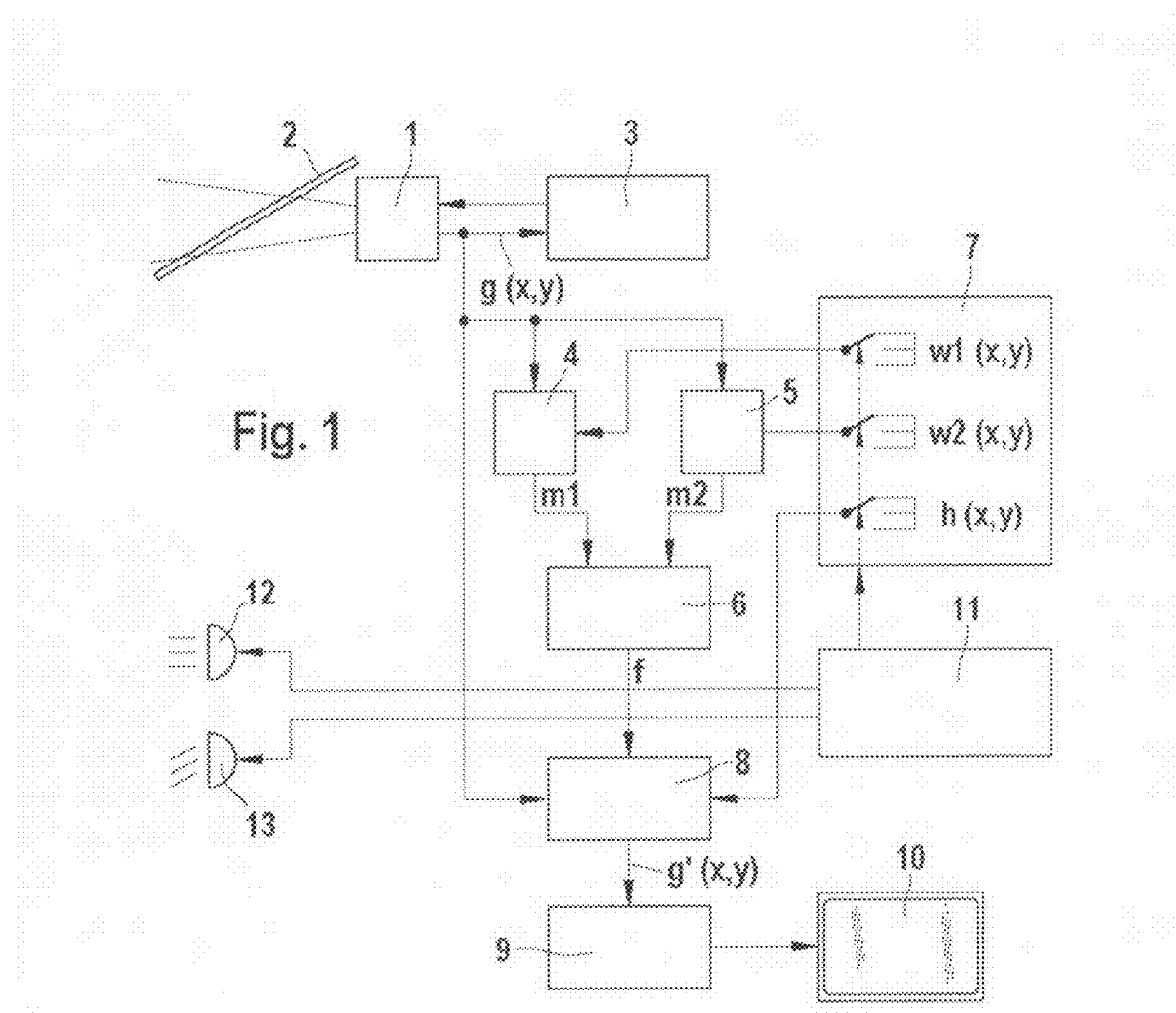
FIG. 1 shows a block diagram for explaining the method according to the present invention.

FIG. 1 shows a device for executing the method according to the present invention, some blocks representing circuits and other components (hardware) and other blocks representing parts of a program which runs on a microcomputer. A camera 1 "sees" through windshield 2 of a vehicle (not shown), for example. This is preferably a camera sensitive in the near infrared range. The scene in front of the vehicle is illuminated by headlights 12, 13 which are switched on or off by a control device 11 either by driver inputs or automatically. Pivoting headlights, e.g., the ones for following turns, may also be operated together with the method according to the present invention.

Video camera 1 is equipped with a baffle (not shown) and connected to a control device 3 which adjusts the camera to the different lighting conditions in particular. Video camera 1 generates digital video signals, also referred to as image data. Since, as a rule, this is a monochrome camera, the image data contain a gray value g for each pixel on the x, y coordinates. The gray value is supplied to weighted gray value averaging, weighted averaging 4 essentially taking into account the pixels which are situated outside the illuminated roadway, while the gray values of the pixels which are essentially situated within the area of the illuminated roadway are averaged in 5.

A ratio of the two mean values m1 and m2 is formed in 6, thereby generating second factor f. First factor h as well as parameters w1 and w2 are stored in a memory 7. Since the illumination depends on the actual headlight focusing, multiple parameter sets w1, w2, h are stored in memory 7, one respective parameter thereof being read from the memory by control device 11 of headlights 12, 13.

Weighted gray values g' (x,y) are calculated in unit 8 according to the following formula:

$$g'(x,y)=g(x,y)\cdot(1-(1-f)\cdot h(x,y)),$$

where g' denotes the weighted gray values, g denotes the non-weighted gray values, f denotes the second factor, and h denotes the first factor, while x and y denote the coordinates of the pixels. The weighted gray values are then supplied to an activation unit 9 of a display screen 10.

For determining first factor h, video camera 1 is focused on a well-remitting surface which is illuminated by the headlights, such as a roadway. This generates the image shown in FIG. 2, the decreasing brightness being depicted as lines of the same brightness. In simple terms, the result is an inner area 21 which is very bright and an outer area 22 which is less bright, the transition being gradual.

Figure 2:
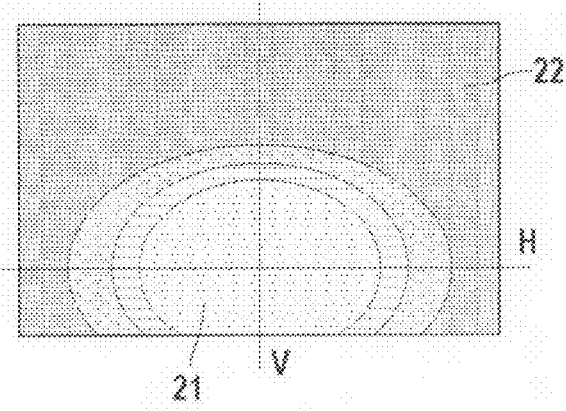
FIG. 2 shows a schematic representation of a screen image for displaying the first factor.
Figure 3:
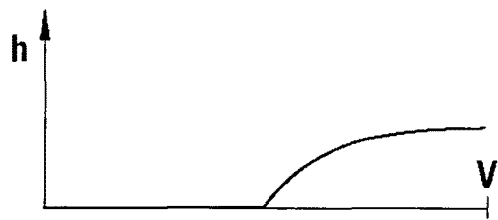
FIG. 3 and FIG. 4 show curves of the gray values of the first factor in a selected column and in a selected row of the image according to FIG. 2, FIG. 5 and FIG. 6 show weighting factors in the curve of the selected row according to a first exemplary embodiment of the method according to the present invention.
Figure 4:
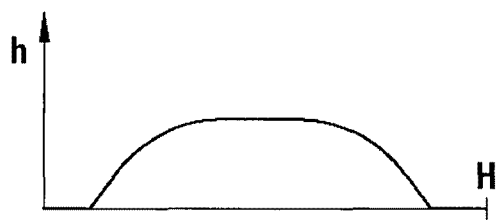
Figure 10:
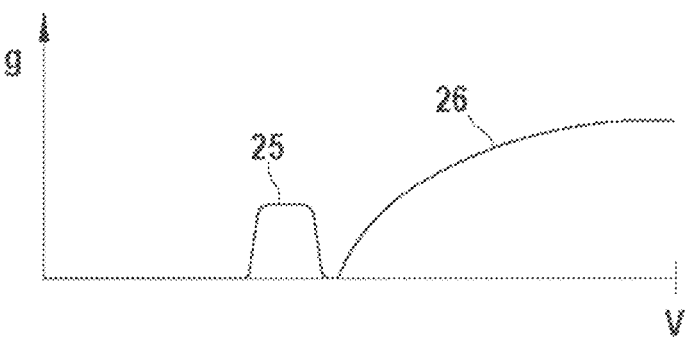
FIG. 10 shows the curve of the gray values in a column of the image according to FIG. 9 without a reduced contrast.
Figure 11:
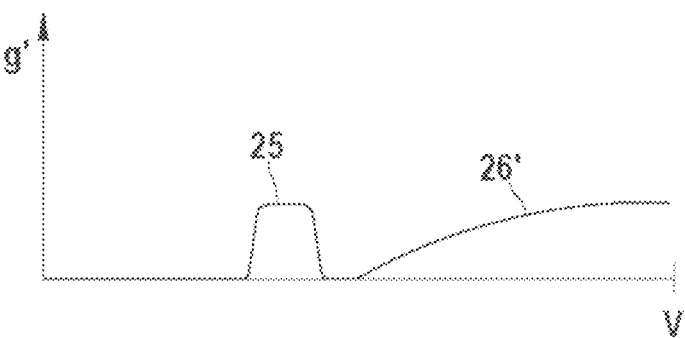
FIG. 11 shows the same with a reduced contrast using the method according to the present invention.

The following FIGS. 3 through 8 as well as FIGS. 10 and 11 represent the variation of the gray values and parameters for a selected column V and a selected row H of the image according to FIG. 2. It can be seen in FIGS. 3 and 4 that the gray values in the selected column gradually increase from the center downward, while the gray values in the selected row are high in a center area and gradually decrease toward the edges. The recorded values are stored in the memory as first factor h (x,y) for all pixels.

Figure 5:
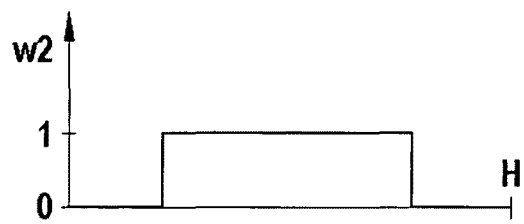
Figure 6:
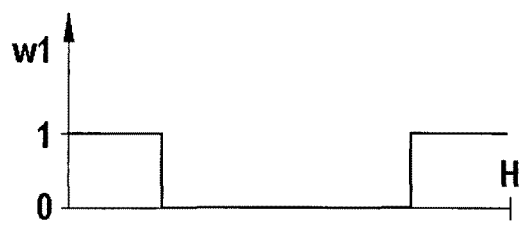

For forming parameters w1 and w2 for the second factor, two options are explained in the exemplary embodiment. One option shown in FIGS. 5 and 6 is that, by comparing factor h with a threshold value, all parameters w2 for image area 21 assume the value 1 and are 0 outside this area, while parameter w1 assumes the value 1 for pixels outside the area and is 0 for pixels inside the area. A value 1 means that the respective pixel enters into the averaging and 0 means that is does not enter into the averaging.

It should be mentioned in this connection that the second factor, calculated with the aid of parameters w1 and w2, and thus the reduction factor, applies over the entire image so that no edges appear at the points at which w1 and w2 have jumps. Sudden changes in the reduction factor may occur at the most when a brightness jump in the image, due to the jumps of parameters w1 and w2, crosses the given boundaries between areas 21 and 22. This exemplary embodiment is otherwise characterized by relatively little need for computing power.

Figure 7:
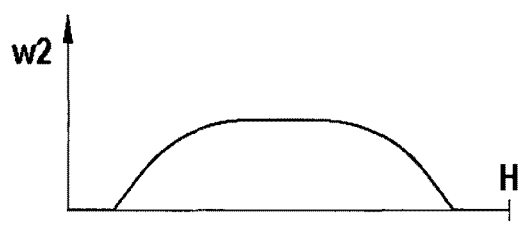
FIG. 7 and FIG. 8 show weighting factors for a selected row according to a second exemplary embodiment of the method.
Figure 8:
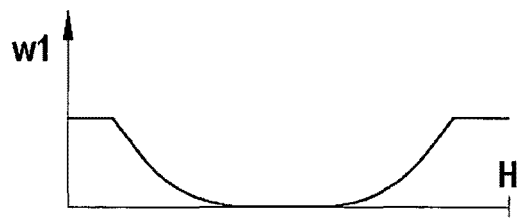

In the embodiment, which is explained in the following on the basis of FIGS. 7 and 8, image areas 21 and 22 are not separated artificially by a sharp boundary, but rather the actually present gradual transitions of first factor h are used for generating parameters w1 and w2. This occurs in that w2 corresponds to first factor h (FIG. 7) and that the one minus h is calculated for forming w1.

Weighted averaging 4, 5 (FIG. 1) is subsequently performed according to the following equations:

m1=[Σw1($x,y$)·g(x,y)]/[ρw1($x,y$)] for all representative pixels in area 22, and m2=[Σw2($x,y$)·g(x,y)]/[Σw2($x,y$)] for all representative pixels in area 21, where n1 and n2 are the numbers of the representative pixels in the respective areas.

Figure 9:
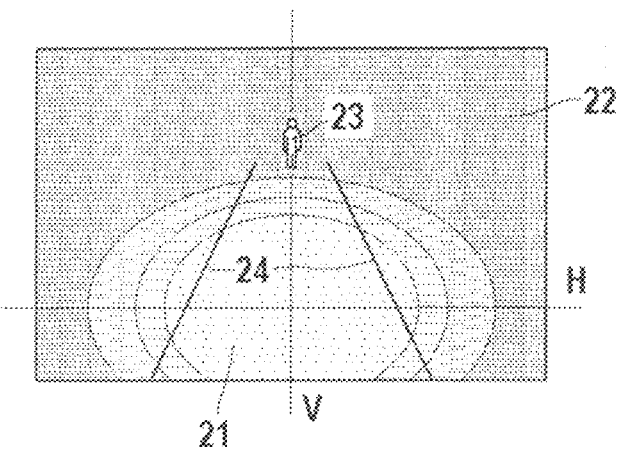
FIG. 9 shows a schematic representation of a screen image which appears during execution of the method.

FIG. 9 represents a real scene in simplified form showing the image of a roadway 24 on which a person 23 is present. Moreover, image areas 21 and 22 as well as selected column V and row H according to FIG. 2 are represented in FIG. 9.

FIG. 10 shows gray values G of the recorded signal. Gray values 25, which represent the person, are typically lower than gray values 26 of roadway 24 illuminated in the foreground, as long as roadway 24 is bright, i.e., it is a dry concrete or gravel road. Due to the reduction using the method according to the present invention, gray values 25 are essentially preserved, while gray values 26' are distinctly reduced vis-à-vis gray values 26 (FIG. 11). The darker the roadway, the smaller the reduction, since the first factor, ascertained in the presence of a bright roadway using the method according to the present invention, only determines the variation but not the extent of the reduction, which depends on the actually present average brightness in image areas 21 and 22 (FIG. 9).

Figure 12:
FIG. 12 shows an image without the method according to the present invention being used.
Figure 13:
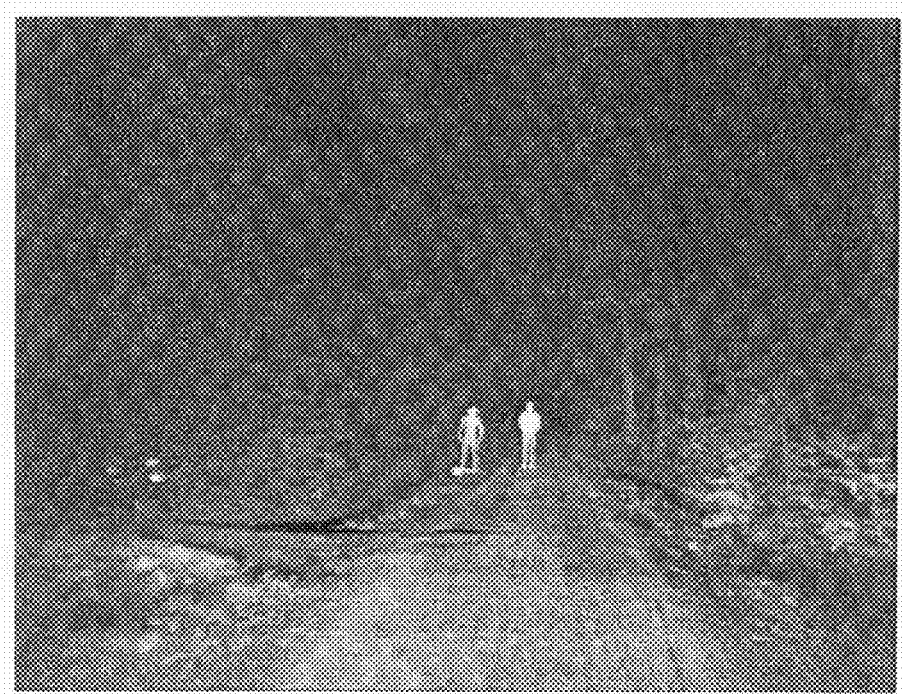
FIG. 13 shows an image with the contrast being reduced using the method according to the present invention.

FIGS. 12 and 13 show screen images, the image in FIG. 12 being recorded without application of the measures according to the present invention. It can be clearly seen that the brightness of the roadway, in this case the dirt road, overpowers other image details so that the images of the persons on the road do not appear as clearly as in the screen image in FIG. 13 in which the brightness of the roadway is substantially reduced. The driver immediately notices the persons on the road, even at a glimpse. As an additional effect, FIG. 13 shows that the structures of the road are better recognizable than without the reduction of the contrast.

What is claimed is:

1. A method for displaying an image of a scene in front of a vehicle, the image containing a roadway capable of illumination by headlights of the vehicle, the method comprising:
   recording the image by a video camera;
   weighting, using a reduction factor, gray values of pixels of image data generated by the video camera in such a way that a contrast between a display of a near range in front of the vehicle and a display of other parts of the image is reduced, the reduction factor being a function of a location of a respective pixel within the image and of a brightness of an object in the near range in front of the vehicle;
   calculating the reduction factor from a first factor and a second factor, the first factor determining a distribution of a reduction across the image, and the second factor determining a degree of reduction independently from a location within the image; and
   forming the second factor from a ratio of a first mean value and a second mean value, an assignment of positions in the image for forming the first mean value and the second mean value taking place in reverse as a function of the first factor.

2. The method as recited in claim 1, wherein the first factor corresponds to a camera display of a brightness distribution of a well-remitting roadway illuminated by the headlights.

3. The method as recited in claim 1, further comprising:
   storing the first factor as a matrix of values.

4. The method as recited in claim 1, wherein the assignment takes place in such a way that the gray values of the pixels, for which the first factor is less than a threshold value, enter into the first mean value and that the gray values of the pixels, for which the first factor is greater than the threshold value, enter into the second mean value.

5. The method as recited in claim 4, wherein representative pixels, distributed across the image, are used for forming the first mean value and the second mean value.

6. The method as recited in claim 1, further comprising:
   multiplying the gray values of the pixels by the complement on one of the first factor, for the formation of a first average value;
   multiplying the gray values by the first factor for the formation of a second average value; and
   summing the first average value and the second average value.

7. The method as recited in claim 1, wherein weightings for the pixels, used for forming the second factor, are stored in a memory.

8. The method as recited in claim 7, wherein different sets of the variables stored in the memory are stored which correspond to different degrees of illumination of the roadway, and respective sets are selected as a function of the set or actually existing illumination by the headlights.

9. A method for displaying an image of a scene in front of a vehicle, the image containing a roadway capable of illumination by headlights of the vehicle, the method comprising:
   recording the image by a video camera;
   weighting, using a reduction factor, gray values of pixels of image data generated by the video camera in such a way that a contrast between a display of a near range in front of the vehicle and a display of other parts of the image is reduced, the reduction factor being a function of a location of a respective pixel within the image and of a brightness of an object in the near range in front of the vehicle;
   calculating the reduction factor from a first factor and a second factor, the first factor determining a distribution of a reduction across the image, and the second factor determining a degree of reduction independently from a location within the image;
   wherein the second factor is limited to a value which does not brighten the image, and
   wherein the weighted gray values are calculated as follows:

$$g'(x,y)=g(x,y)\cdot(1-(1-f)\cdot h(x,y)), \text{ where}$$

g' denotes the weighted gray values
g denotes the non-weighted gray values,
f denotes the second factor,
h denotes the first factor, and
x and y denote the coordinates of the pixels.

* * * * *

UNITED STATES PATENT AND TRADEMARK OFFICE
CERTIFICATE OF CORRECTION

PATENT NO. : 8,487,997 B2  
APPLICATION NO. : 11/664357  
DATED : July 16, 2013  
INVENTOR(S) : Stephan Simon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1874 days.

Signed and Sealed this
Eighth Day of September, 2015

Michelle K. Lee
*Director of the United States Patent and Trademark Office*